(12) United States Patent
Locker et al.

(10) Patent No.: US 9,323,756 B2
(45) Date of Patent: Apr. 26, 2016

(54) AUDIO BOOK AND E-BOOK SYNCHRONIZATION

(75) Inventors: Howard Locker, Cary, NC (US); William Fred Keown, Jr., Raleigh, NC (US); James Stephen Rutledge, Durham, NC (US); Kenneth Scott Seethaler, Wake Forest, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1653 days.

(21) Appl. No.: 12/728,384

(22) Filed: Mar. 22, 2010

(65) Prior Publication Data

US 2011/0231474 A1 Sep. 22, 2011

(51) Int. Cl.
*G06F 17/30* (2006.01)
*G10L 15/26* (2006.01)
*H04L 29/08* (2006.01)
*G06F 3/16* (2006.01)

(52) U.S. Cl.
CPC .... *G06F 17/30058* (2013.01); *G06F 17/30017* (2013.01); *G06F 17/30064* (2013.01); *G06F 17/3074* (2013.01); *G06F 17/30743* (2013.01); *G06F 17/30796* (2013.01); *G10L 15/26* (2013.01); *H04L 67/1095* (2013.01); *G06F 3/16* (2013.01)

(58) Field of Classification Search
CPC ............... G06F 17/30017; G06F 17/30058; G06F 17/30064; G06F 17/3074; G06F 17/30743; G06F 17/30796; H04L 67/1095; G10L 15/26
USPC ......... 709/205; 455/414.3; 382/229; 715/202
See application file for complete search history.

(56) References Cited

U.S. PATENT DOCUMENTS

| | | | |
|---|---|---|---|
| 2008/0088602 A1* | 4/2008 | Hotelling | 345/173 |
| 2008/0146892 A1* | 6/2008 | LeBoeuf et al. | 600/300 |
| 2008/0200154 A1* | 8/2008 | Maharajh et al. | 455/414.3 |
| 2010/0050064 A1* | 2/2010 | Liu et al. | 715/202 |
| 2010/0092095 A1* | 4/2010 | King et al. | 382/229 |
| 2010/0231537 A1* | 9/2010 | Pisula et al. | 345/173 |
| 2012/0197998 A1* | 8/2012 | Kessel et al. | 709/205 |

* cited by examiner

*Primary Examiner* — Le H Luu
(74) *Attorney, Agent, or Firm* — John L. Rogitz; John M. Rogitz (57) ABSTRACT

An electronic device receives a stop position tag that indicates a stop position within first electronic content which is a first sensory type. The electronic device identifies a start position within second electronic content using the stop position tag. The second electronic content is a second sensory type that is different than the first sensory type. In turn, the electronic device executes the second electronic content at the identified start position. In one embodiment, the first sensory type is an auditory sensory type and the second sensory type is an image sensory type.

19 Claims, 8 Drawing Sheets

FIG. 8

AUDIO BOOK AND E-BOOK SYNCHRONIZATION

TECHNICAL FIELD

The present disclosure relates to synchronizing an audio book with an electronic book (e-Book) when a user terminates one of the books at a stop position and wishes to re-engage a corresponding start position using the other book.

BACKGROUND

Literature is available in many different formats today. Two popular formats for books are audio books and electronic books (e-Books). An audio book is typically a recording of commercially printed material, such as a published book or journal. An e-book, also known as a digital book, includes text that forms a digital media equivalent of a conventional printed book, sometimes restricted with a digital rights management system. Electronic book content may be read on devices such as e-Readers, personal computers, notebooks, netbooks, desktops, tablets, slates, personal digital assistants, cell phones, and etcetera.

SUMMARY

An electronic device receives a stop position tag that indicates a stop position within first electronic content which is a first sensory type. The electronic device identifies a start position within second electronic content using the stop position tag. The second electronic content is a second sensory type that is different than the first sensory type. In turn, the electronic device executes the second electronic content at the identified start position. In one embodiment, the first sensory type is an auditory sensory type and the second sensory type is an image sensory type.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood and its numerous features and advantages made apparent to those skilled in the art by referencing the accompanying drawings, wherein.

DETAILED DESCRIPTION

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
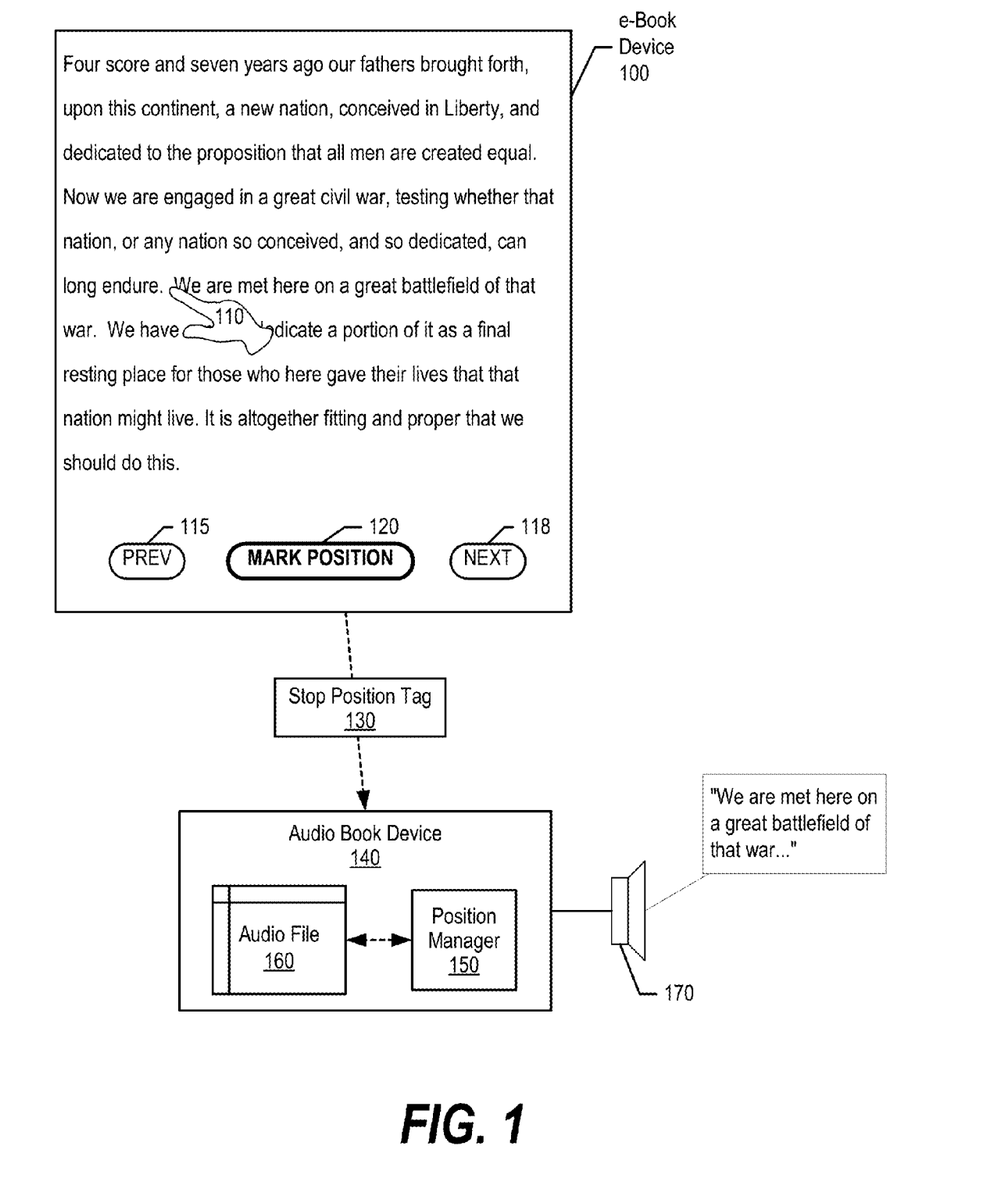
FIG. 1 is a diagram showing a user bookmarking a location in an electronic book content and using an audio book device to commence playback at the bookmark location.
Figure 2:
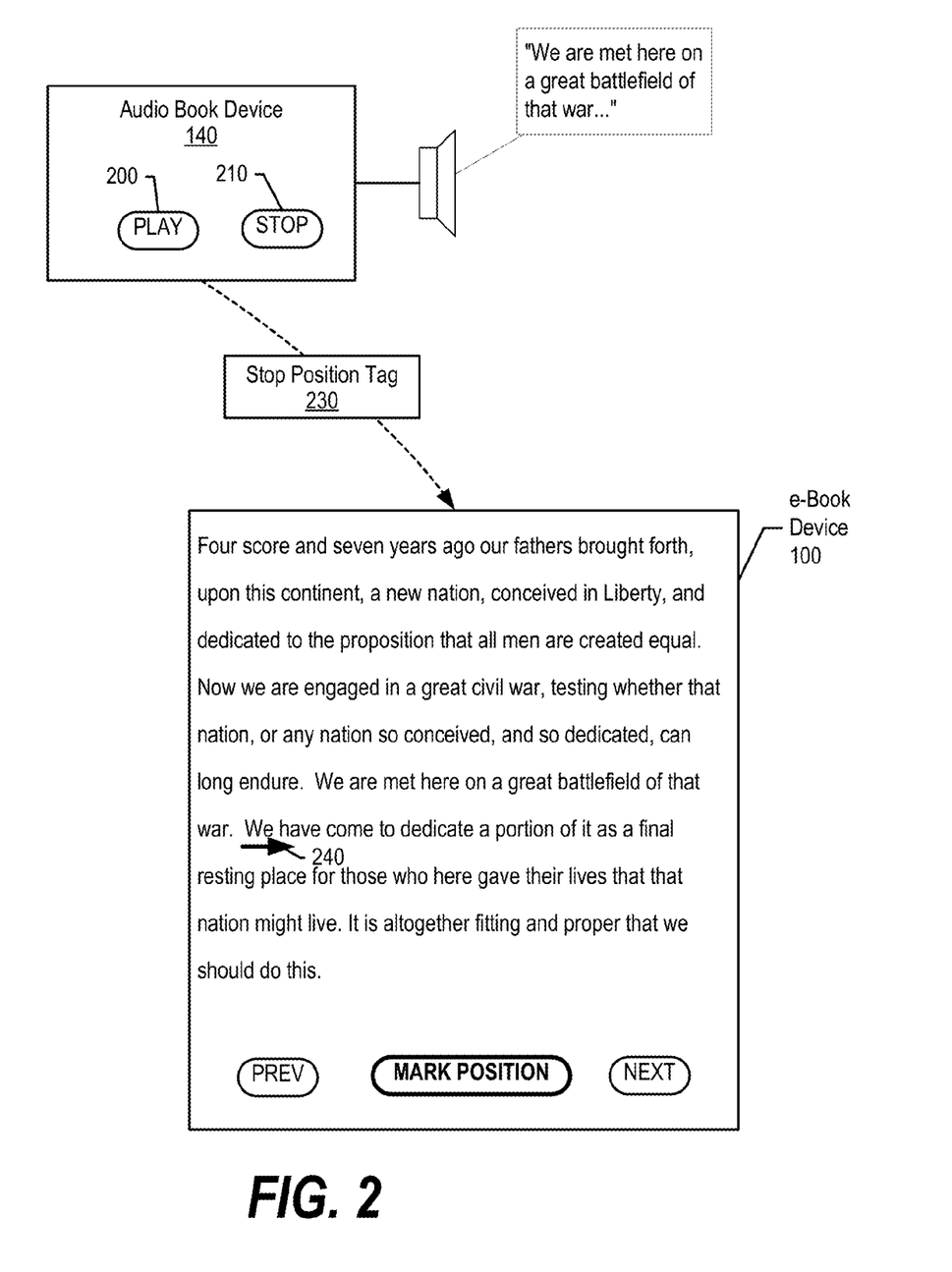
FIG. 2 is a diagram showing an audio book device marking a stop position in an audio book and an e-Book device displaying text at a start position that corresponds to the marked stop position.

FIG. 1 is a diagram showing a user bookmarking a location in an electronic book and using an audio book device to commence playback at the bookmark location. Electronic book (e-Book) device 100 displays electronic content of a document (e.g., text file, or e-Book book) for a user to read. The electronic content is an "image sensory type," which is a type of content that is intended to produce an image for a user to view, such as a text file, HTML file, XML file, pdf file, etc. As used herein, an e-Book device is an electronic device that processes electronic book content, such as e-Readers, personal computers, notebooks, netbooks, desktops, tablets, slates, personal digital assistants, cell phones, and etcetera.

Audio book device 140 executes "auditory sensory types," which is a type of content that produces audio for the user to hear, such as a way file, MP3 file, M4a file, M4b file, etc. A user may wish to switch between e-Book device 100 and audio device 140 at various times while reading/listening to a particular book. For example, the user may be reading a book using e-Book device 100 and have to run an errand in a car. In this example, the user may wish to synchronize e-Book device 100 with audio device 140 in order for audio device 140 to commence playback (via speaker 170) at a position within audio file 160 that corresponds to a position that the user stopped reading on e-Book device 100. E-Book book device 100 and audio device 140 may be the same device (see FIG. 3) or multiple devices, such as that shown in FIG. 1.

A user reads text displayed by e-Book device 100 and may select buttons 115 or 118 to view previous pages or next pages, respectively. In one embodiment, e-Book device 100 logs a stop position after every "page turn" in order to mark, at a minimum, the page at which the user is reading. In another embodiment, when the user wishes to stop reading in the middle of a page, such as after a particular sentence, the user selects button 120, which allows the user to mark a stop position (shown by hand 110). In one embodiment, e-Book device 100 may provide a cursor for the user to position at a particular location. In yet another embodiment, the stop point may be marked by a user simply touching a word or sentence. In yet another embodiment, e-Book device 100 may receive a voice command to set the stop point and/or start point.

E-Book device 100 stores the stop position (e.g., from a page turn or a user's marked position) in stop position tag 130. In one embodiment, the electronic content displayed by e-Book device 100 includes predefined "location-based identifiers" at various locations (e.g., each chapter, each paragraph, each sentence, each word, etc.) that e-Book device 100 captures based upon, for example, the user's mark position. In this embodiment, e-Book device 100 may include the captured location-based identifier in stop position tag 130. In another embodiment, the electronic content may include time-based identifiers, which correspond, for example, the amount of time that a corresponding audio book would take to reach the stop position (see FIG. 6 and corresponding text for further details). In this embodiment, e-Book device 100 may include a time-based text identifier in stop position tag 130.

Audio book device 140 receives stop position tag 130 and passes it to position manager 150. In one embodiment, audio device 140 initiates a synchronization between e-Book device 100 in order to obtain stop position tag 130. In another embodiment, e-Book device 100 sends stop position tag 130 to a server over a computer network for audio device 140 to retrieve from the server (see FIG. 4 and corresponding text for further details). In yet another embodiment, a single electronic device may be capable of processing two sensory types, such as an image sensory type and an auditory sensory type. In this embodiment, the electronic device's e-Book application may store position tag 130 internally in order for the electronic device's audio book application to retrieve (see FIG. 3 and corresponding text for further details).

Position manager 150 identifies a start position to play audio file 160 based upon stop position tag 130. In one embodiment, position manager 150 matches stop position tag 130 with an identical start position in order for audio book device 140 to play audio file 160 at the same location that the user stopped reading. In another embodiment, the user may configure audio device 140 to commence playback a few paragraphs before the stop position in order to refresh the user's mind as to what the user recently read. In yet another embodiment, position manager 150 may convert the stop position to a time-based value if needed, such as the start position being 45 minutes into audio file 160. Meaning, in this embodiment, position manager would identify a location in audio file 160 that corresponds to playing audio file 160 for 45 minutes, and commence playback at that point.

FIG. 2 is a diagram showing an audio device marking a stop position in an audio file and an e-Book device displaying an image file at a start position that corresponds to the marked stop position. Audio device 140 includes buttons 200 and 210 for a user to select, which causes audio device 140 to play or stop an audio file, respectively. When the user selects button 210, audio book device logs a stop position (e.g., location-based or time-based) of the audio file.

Audio device 140, in turn, includes the stop position in stop position tag 230 and sends stop position tag 230 to e-Book device 100. As discussed previously, e-Book device 100 may initiate a synchronization between audio device 140 to obtain position tag 130. In another embodiment, audio device 140 sends stop position tag 230 to a server over a computer network for e-Book device 100 to retrieve from the server (see FIG. 4 and corresponding text for further details). In yet another embodiment, a single electronic device may be capable of processing two sensory types, such as an image sensory type and an auditory sensory type. In this embodiment, the electronic device's e-Book application may store stop position tag 230 internally in order for the electronic device's audio book application to retrieve (see FIG. 3 and corresponding text for further details).

E-Book device 100 identifies a start position, based upon stop position tag 230, to display e-Book device 100's e-Book file. In one embodiment, e-Book device 100 may translate a time-based stop position to a format that corresponds to the e-Book file (e.g., location-based format).

E-Book device 100 identifies a particular page to display, and overlays start position identifier 240 at the start position in order to provide the user with an indication of the next sentence to read. In one embodiment, e-Book device 100 may place start position identifier 240 at the beginning of a paragraph in order to refresh the user as to what the user recently heard.

Figure 3:
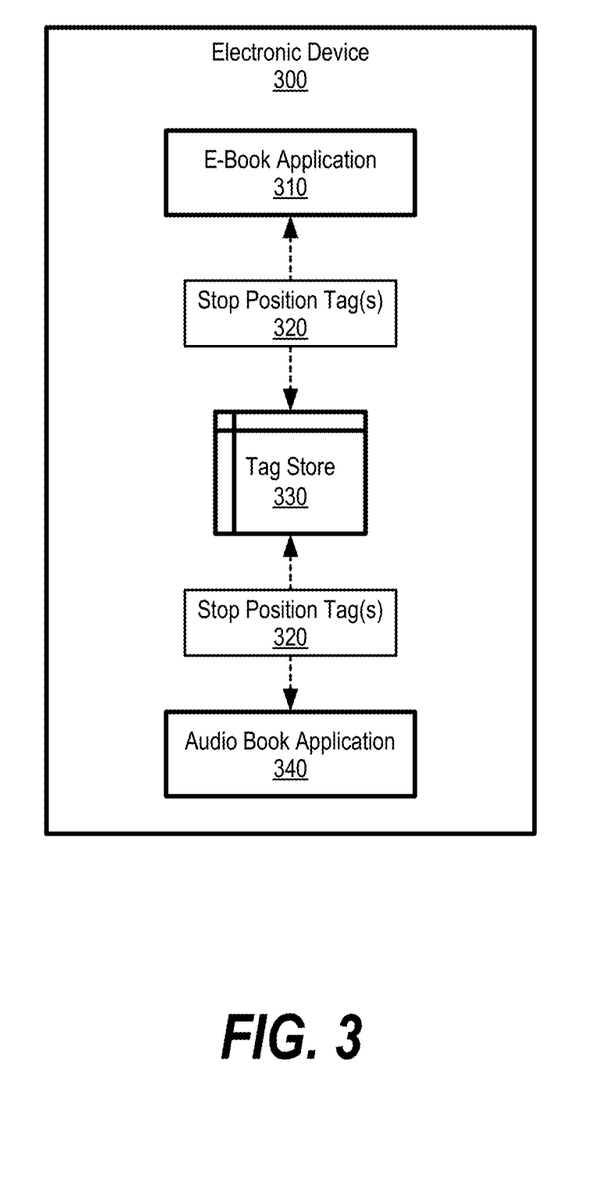
FIG. 3 is a diagram showing an electronic device capable of processing image sensory types and auditory sensory types.

FIG. 3 is a diagram showing an electronic device capable of executing image sensory types and auditory sensory types. FIG. 3 shows an example of an electronic device (300) capable of processing multiple files with different sensory types. The example shown in FIG. 3 shows that electronic device 300 includes e-Book application 310 for processing image sensory types, and also includes audio book application 340 for processing auditory sensory types. In another example, an electronic device may be capable of processing an auditory sensory type and a touch sensory type, such as a device that a vision impaired person may use to listen to a book, and then switch to reading the book using brail.

FIG. 3 shows that, since electronic device 300 is capable of processing multiple sensory types, the individual applications (e-Book application 310 and audio book application 340) are able to store and retrieve position tags 320 from internal memory (tag store 330). As one skilled in the art can appreciate, electronic device 300 may also provide position tags 320 to other electronic devices using embodiments discussed in FIGS. 1 and 2.

Figure 4:
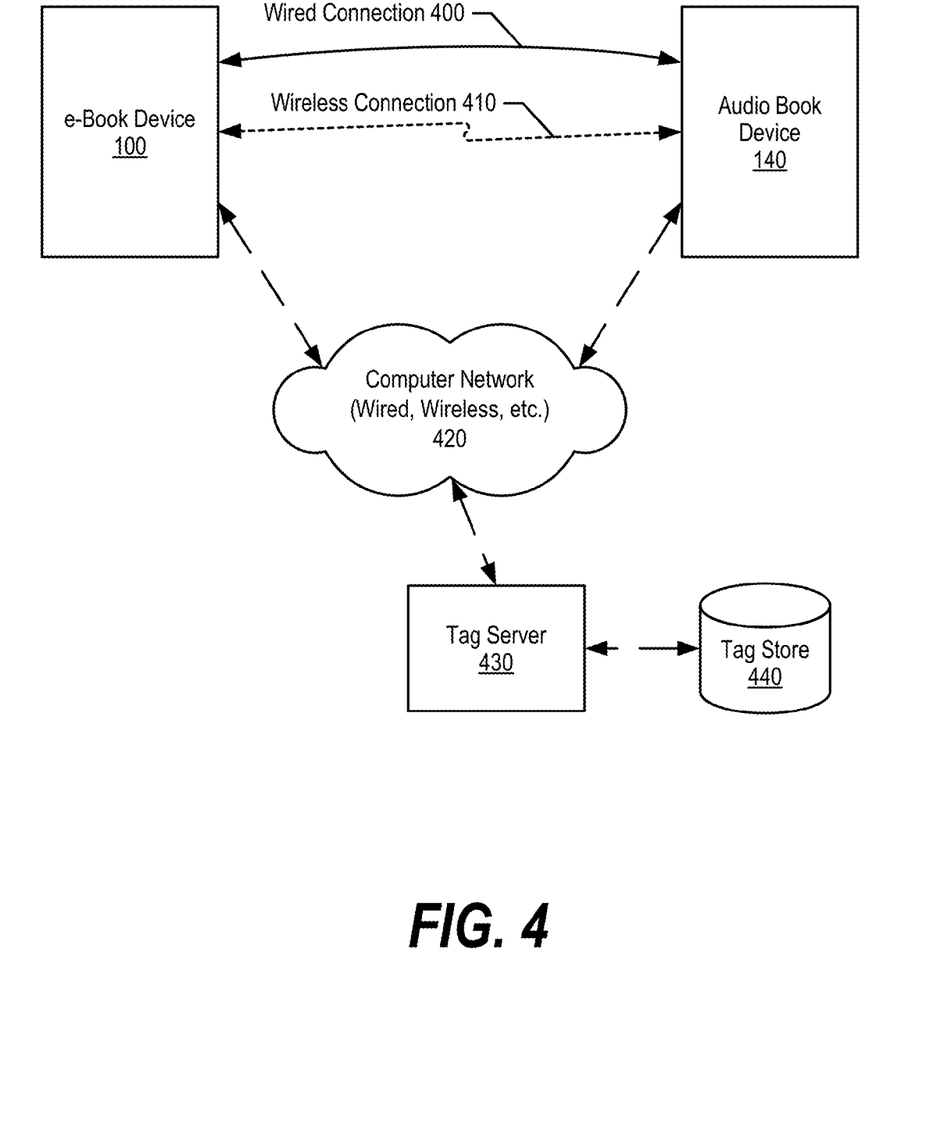
FIG. 4 is a diagram showing various communication mechanisms to synchronize an electronic book device with an audio book device.

FIG. 4 is a diagram showing various communication mechanisms to synchronize an electronic book device with an audio book device. E-Book device 100 and audio book device 140 may exchange stop position tags using various mechanisms, such as wired connection 400 (e.g., USB cable) or wireless connection 410 (e.g., Bluetooth).

In addition, e-Book device 100 and audio book device 140 may use a "centralized" approach to exchange stop position tags, such communication through computer network 420 to tag server 430, which stores position tags in tag store 440. In one embodiment, e-Book device 100 and audio book device 140 may exchange stop position tags using "cloud" computing, which broadly shares computer resources across computer networks.

Figure 5:
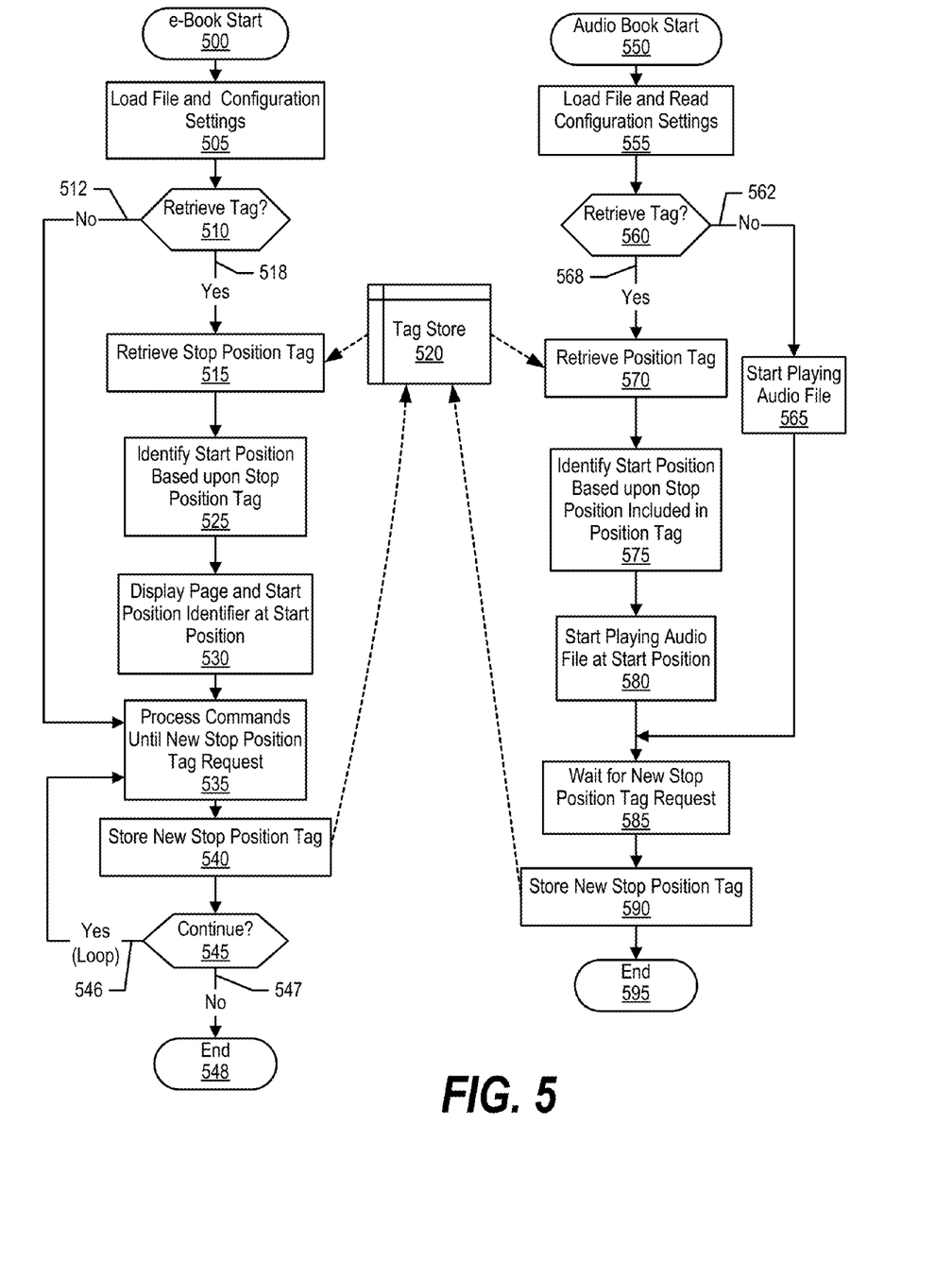
FIG. 5 is a flowchart showing steps taken in an e-Book device and an audio book device synchronizing stop positions with each other.

FIG. 5 is a flowchart showing steps taken in an e-Book device and an audio book device synchronizing stop positions with each other. E-Book device processing commences at 500, whereupon the e-Book device loads an e-Book file (image file) and configuration settings at step 505. The configuration settings include, for example, an indication as to whether the e-Book device should check for a stop position tag. In one embodiment, the configuration settings may instruct the e-Book device to overlay a start position identifier a number of chapters before a corresponding stop position tag, or overlay the start position identifier at the sentence following the stop position.

A determination is made as to whether to retrieve a stop position tag (step 510). For example, a user may select a button (e.g., "synchronize") when the e-Book file loads, which instructs the e-Book device to retrieve a stop position tag. If the e-Book device should not retrieve a stop position tag (e.g., start of a new book), decision 510 branches to "No" branch 512, whereupon the e-Book device processes other commands, such as receiving input from a user to display a particular chapter or start at the beginning of a book (step 535). On the other hand, if the e-Book device should retrieve the stop position tag, decision 510 branches to "Yes" branch 518, whereupon the e-Book device retrieves a stop position tag from tag store 520 at step 515. In one embodiment, tag store 520 is located in an electronic device that processes multiple sensory types (e.g., image sensory types and auditory sensory types, such as an e-Book device that also plays audio books. In another embodiment, the e-Book device sends a request to a server over a computer network to retrieve the position tag (see FIG. 4 and corresponding text for further details). In yet another embodiment, the e-Book device synchronizes with a different electronic device (e.g., audio book device), either wirelessly or wired, and receives the position tag from the different electronic device.

Next, the e-Book device identifies a corresponding start position to start the e-Book file based upon the stop position tag (step 525). For example, the e-Book device may detect that the stop position tag corresponds to page 15, paragraph 4, sentence 3 in the e-Book file, and identifies a start position at the particular location. In one embodiment, the e-Book device may identify the start position as the beginning of the corresponding paragraph. In yet another embodiment, the e-Book device may identify the start position at a paragraph prior to the stop position. The e-Book device, at step 530, displays a corresponding page and overlays a start position identifier at the start position, such as identifier 240 shown in FIG. 2.

The e-Book device processes commands and waits for a stop position request at step 535. For example, the e-Book device may be configured to store a stop position every time the user "turns a page" in order to track the user's location at a page level. In another embodiment, the user may indicate a particular sentence that the user stopped reading (see FIG. 1 and corresponding text for further details). Once the stop position request occurs, the e-Book device identifies a particular stop position and stores a new stop position tag with the new stop position in tag store 525 at step 540. In one embodiment, the e-Book device may temporarily log new stop position tags (e.g., each page turn) and wait until a user shuts down the e-Book before storing a final stop position tag.

A determination is made as to whether to continue processing the e-Book file, such as a user turning a page and continuing to read (decision 545). If e-Book processing should continue, decision 545 branches to "Yes" branch 546, which loops back to process commands and stop position tag requests. This looping continues until the e-Book device should terminate processing (e.g., shut down), at which decision 545 branches to "No" branch 547 whereupon e-Book processing ends at 548.

Audio book processing commences at 550, whereupon the audio book device loads an audio file and configuration settings at step 555. The configuration settings include, for example, an indication as to whether the audio book device should check for a stop position tag, or the configuration settings may indicate a location to play the audio file relative to a stop position included in the position tag.

A determination is made as to whether to check for a stop position tag (decision 560). If the audio book device should not check for a stop position tag, decision 560 branches to "No" branch 562, whereupon the audio book device starts playing an audio file at step 565. On the other hand, if the audio book device should check for a stop position tag, decision 560 branches to "Yes" branch 568, whereupon the audio book device retrieves the stop position tag from tag store 520 at step 570 (previously stored by the e-Book device in step 540). As discussed above, in one embodiment, tag store 520 is located in an electronic device that processes multiple sensory types (e.g., image sensory types and audio sensory types). In another embodiment, the audio book device sends a request to a server over a computer network to retrieve the position tag (see FIG. 4 and corresponding text for further details). In yet another embodiment, the audio book device synchronizes with a different electronic device (e.g., e-Book device), either wirelessly or wired, and receives the position tag from the different electronic device.

Next, the audio book device identifies a corresponding start position to start the audio file based upon the stop position tag (step 575). For example, the audio book device may detect that the stop position tag corresponds to page 15, paragraph 4, sentence 3 in an image file, and identifies a start position at location in the audio file. In another embodiment, the audio book converts a location-based stop position to a time-based start position, such as converting page 15, paragraph 4, and sentence 3 to a time-based start position of 45 minutes into the audio file.

Next, at step 580, the audio book device commences playback at the start position. The audio book continues to play the audio book until it detects a stop position tag request, such as when a user selects a stop button (step 585). The audio device stores a new stop position tag, with the new stop position, in tag store 520 (step 590), and audio book processing ends at 595.

Figure 6:
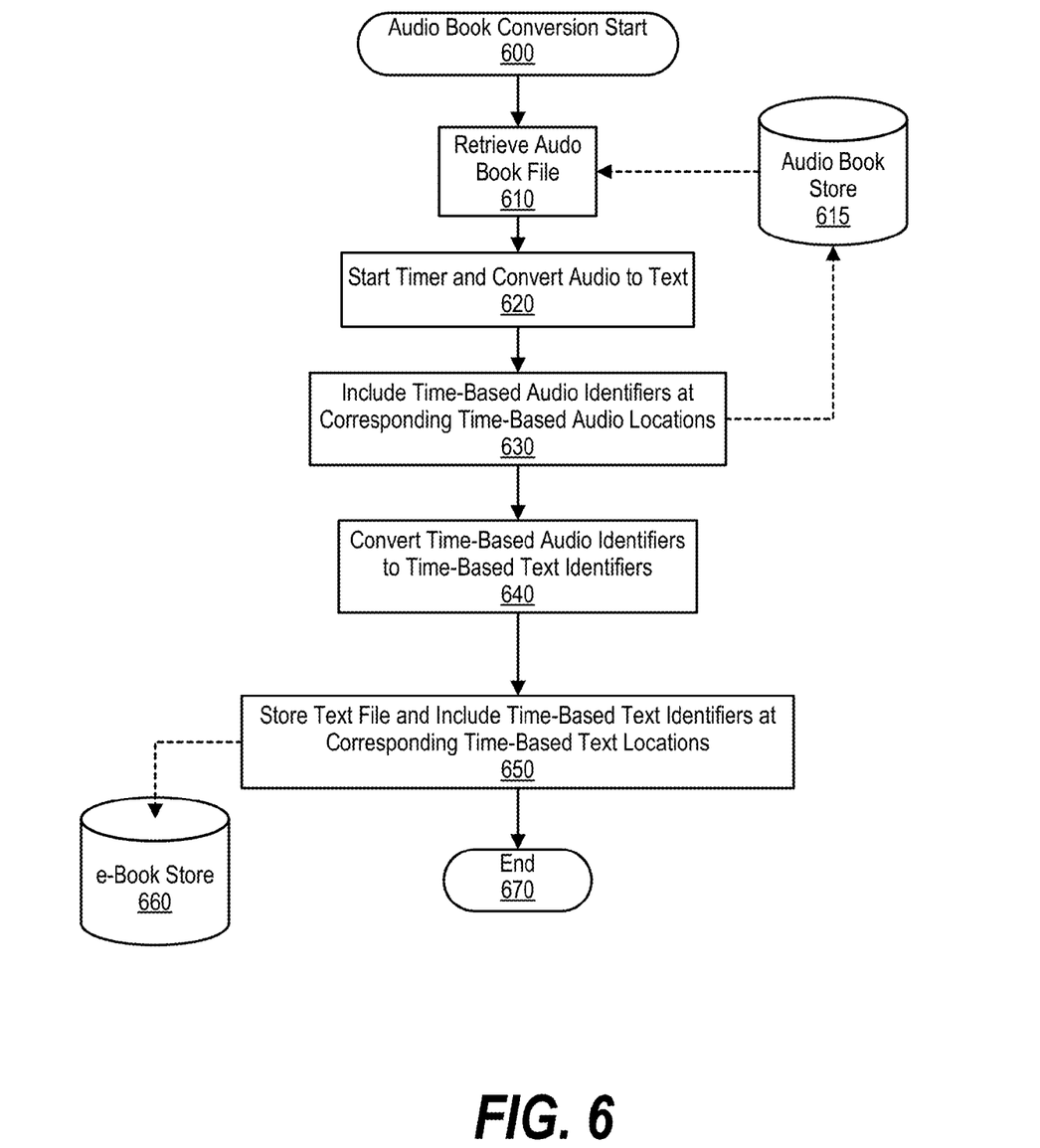
FIG. 6 is a flowchart showing steps taken in converting an audio book to an e-Book and associating time-based identifiers to both the audio book and the e-Book.

FIG. 6 is a flowchart showing steps taken in converting an audio book file to an e-Book file and associating time-based identifiers to both the audio book file and the e-Book file. One embodiment discussed above is to use time-based identifiers to synchronize an e-Book file with an audio book file. FIG. 6 shows one embodiment of how to convert an audio file to a text file (e-Book file) and associate time-based identifiers to both the audio file and the e-Book file.

Audio book conversion processing commences at 600, whereupon processing (e.g., a computer system) retrieves an audio book file from audio book store 615 (step 610). At step 620, processing starts a timer (to generate time-based audio identifiers) and starts converting the audio file to a text file at a rate at which the audio content is played. Next, processing includes the time-based audio identifiers in the audio file at particular time-based audio locations (step 630). For example, processing may generate a time-based audio identifier at each chapter, paragraph, and/or sentence. In this example, processing places corresponding time-based audio identifiers at their respective chapter, paragraph, and/or sentence.

Next, at step 640, processing converts the time-based audio identifiers to time-based text identifiers, such as converting a time value to a hex value. In one embodiment, processing may use the same values for both time-based audio identifiers and time-based text identifiers. At step 650, processing stores the text file and includes the time-based text identifiers at particular time-based text locations in e-Book store 660, Using the example described above, processing stores corresponding time-based text identifiers at their respective chapter, paragraph, and/or sentence. In turn, the text in the e-Book file and the words in the audio file are synchronized by the time-based text identifiers and time-based audio identifiers, respectively. For example, when a user selects a sentence to stop reading in an e-Book file, an electronic device may select the closest time-based text identifier as a stop position. In this example, a corresponding electronic device that plays audio books is able to translate the time-based text identifier to a time-based audio identifier and start the audio at the corresponding time-based audio location. Conversion processing ends at 670.

Figure 7:
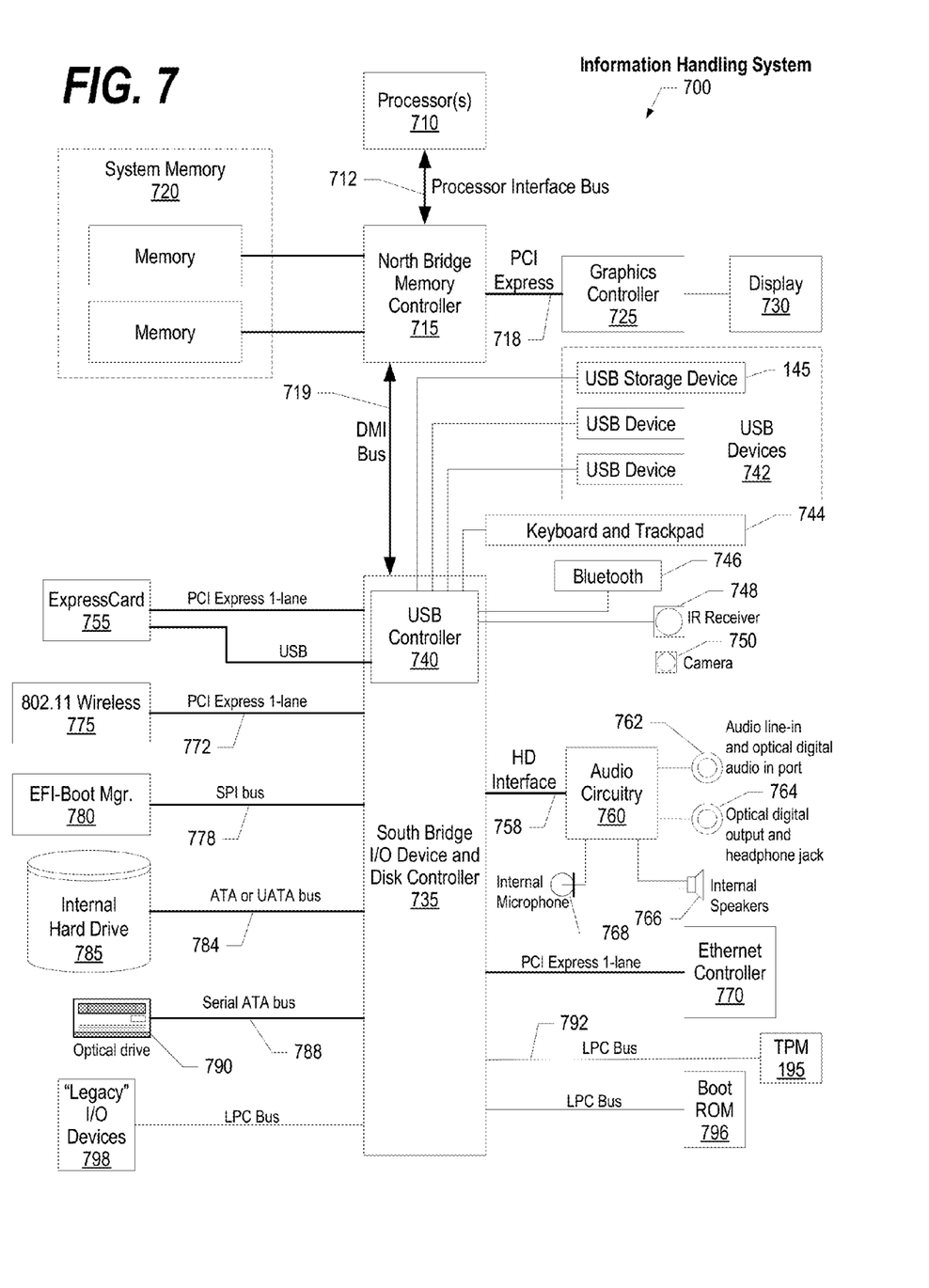
FIG. 7 illustrates information handling system 700, which is a simplified example of a computer system capable of performing the computing operations described herein.

FIG. 7 illustrates information handling system 700, which is a simplified example of a computer system capable of performing the computing operations described herein. Information handling system 700 includes one or more processors 710 coupled to processor interface bus 712. Processor interface bus 712 connects processors 710 to Northbridge 715, which is also known as the Memory Controller Hub (MCH). Northbridge 715 connects to system memory 720 and provides a means for processor(s) 710 to access the system memory. Graphics controller 725 also connects to Northbridge 715. In one embodiment, PCI Express bus 718 connects Northbridge 715 to graphics controller 725. Graphics controller 725 connects to display device 730, such as a computer monitor.

Northbridge 715 and Southbridge 735 connect to each other using bus 719. In one embodiment, the bus is a Direct Media Interface (DMI) bus that transfers data at high speeds in each direction between Northbridge 715 and Southbridge 735. In another embodiment, a Peripheral Component Interconnect (PCI) bus connects the Northbridge and the Southbridge. Southbridge 735, also known as the I/O Controller Hub (ICH) is a chip that generally implements capabilities that operate at slower speeds than the capabilities provided by the Northbridge. Southbridge 735 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 796 and "legacy" I/O devices (using a "super I/O" chip). The "legacy" I/O devices (798) can include, for example, serial and parallel ports, keyboard, mouse, and/or a floppy disk controller. The LPC bus also connects Southbridge 735 to Trusted Platform Module (TPM) 795. Other components often included in Southbridge 735 include a Direct Memory Access (DMA) controller, a Programmable Interrupt Controller (PIC), and a storage device controller, which connects Southbridge 735 to nonvolatile storage device 785, such as a hard disk drive, using bus 784.

ExpressCard 755 is a slot that connects hot-pluggable devices to the information handling system. ExpressCard 755 supports both PCI Express and USB connectivity as it connects to Southbridge 735 using both the Universal Serial Bus (USB) the PCI Express bus. Southbridge 735 includes USB Controller 740 that provides USB connectivity to devices that connect to the USB. These devices include webcam (camera) 750, infrared (IR) receiver 748, keyboard and trackpad 744, and Bluetooth device 746, which provides for wireless personal area networks (PANs). USB Controller 740 also provides USB connectivity to other miscellaneous USB connected devices 742, such as a mouse, removable nonvolatile storage device 745, modems, network cards, ISDN connectors, fax, printers, USB hubs, and many other types of USB connected devices. While removable nonvolatile storage device 745 is shown as a USB-connected device, removable nonvolatile storage device 745 could be connected using a different interface, such as a Firewire interface, etcetera.

Wireless Local Area Network (LAN) device 775 connects to Southbridge 735 via the PCI or PCI Express bus 772. LAN device 775 typically implements one of the IEEE 802.11 standards of over-the-air modulation techniques that all use the same protocol to wirelessly communicate between information handling system 700 and another computer system or device. Optical storage device 790 connects to Southbridge 735 using Serial ATA (SATA) bus 788. Serial ATA adapters and devices communicate over a high-speed serial link. The Serial ATA bus also connects Southbridge 735 to other forms of storage devices, such as hard disk drives. Audio circuitry 760, such as a sound card, connects to Southbridge 735 via bus 758. Audio circuitry 760 also provides functionality such as audio line-in and optical digital audio in port 762, optical digital output and headphone jack 764, internal speakers 766, and internal microphone 768. Ethernet controller 770 connects to Southbridge 735 using a bus, such as the PCI or PCI Express bus. Ethernet controller 770 connects information handling system 700 to a computer network, such as a Local Area Network (LAN), the Internet, and other public and private computer networks. The Trusted Platform Module (TPM 795) provides security functions for information handling system 700.

While FIG. 7 shows one information handling system, an information handling system may take many forms. For example, an information handling system may take the form of a desktop, server, portable, laptop, note-Book, or other form factor computer or data processing system. In addition, an information handling system may take other form factors such as a personal digital assistant (PDA), a gaming device, ATM machine, a portable telephone device, a communication device or other devices that include a processor and memory.

Figure 8:
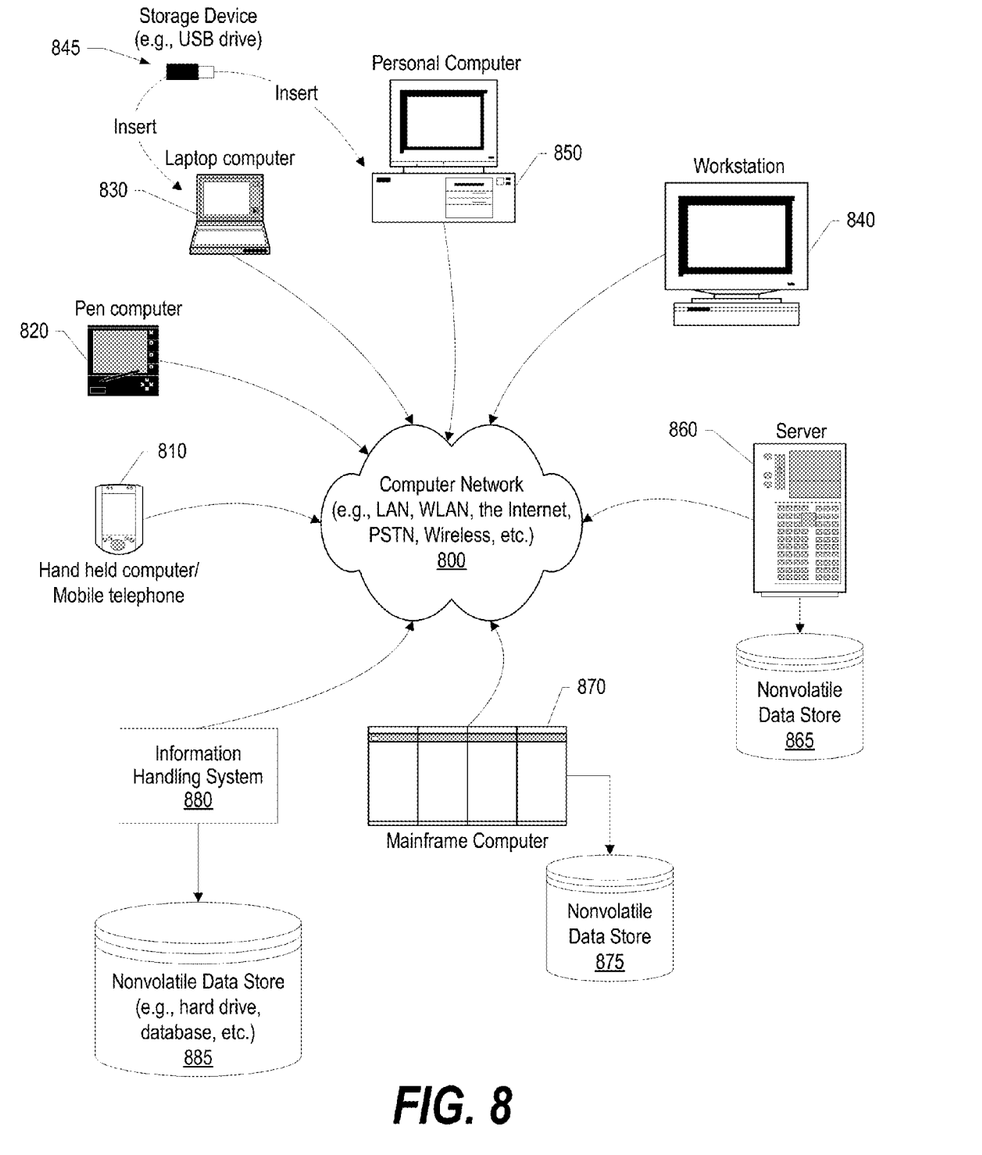
FIG. 8 provides an extension example of the information handling system environment shown in FIG. 7 to illustrate that the methods described herein can be performed on a wide variety of information handling systems that operate in a networked environment.

FIG. 8 provides an extension example of the information handling system environment shown in FIG. 7 to illustrate that the methods described herein can be performed on a wide variety of information handling systems that operate in a networked environment. Types of information handling systems range from small handheld devices, such as handheld computer/mobile telephone 810 to large mainframe systems, such as mainframe computer 870. Examples of handheld computer 810 include personal digital assistants (PDAs), personal entertainment devices, such as MP3 players, portable televisions, and compact disc players. Other examples of information handling systems include pen, or tablet, computer 820, laptop, or note-Book, computer 830, workstation 840, personal computer system 850, and server 860. Other types of information handling systems that are not individually shown in FIG. 8 are represented by information handling system 880. As shown, the various information handling systems can be networked together using computer network 800. Types of computer network that can be used to interconnect the various information handling systems include Local Area Networks (LANs), Personal Area Networks (PAN's), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 8 depicts separate nonvolatile data stores (server 860 utilizes nonvolatile data store 865, mainframe computer 870 utilizes nonvolatile data store 875, and information handling system 880 utilizes nonvolatile data store 885). The nonvolatile data store can be a component that is external to the various information handling systems or can be internal to one of the information handling systems. In addition, removable nonvolatile storage device 845 can be shared among two or more information handling systems using various techniques, such as connecting the removable nonvolatile storage device 845 to a USB port or other connector of the information handling systems.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
   receiving a stop position tag that indicates a stop position within first electronic content, the first electronic content having a first sensory type;
   identifying a start position within second electronic content using the stop position tag, wherein the second electronic content has a second sensory type that is different than the first sensory type; and
   activating a sensory output of an electronic device at the start position of the second electronic content;
   wherein at least one of the first and second sensory types is a touch sensory type.

2. The method of claim 1 further comprising:
   extracting a time-based audio identifier from the stop position tag that corresponds with a stop position within the first electronic content;
   identifying a time-based text identifier that corresponds with the extracted time-based audio identifier; and
   selecting, as the start position, a time-based text location within the second electronic content that corresponds with the identified time-based text identifier.

3. The method of claim 1 wherein the stop position corresponds to a time-based text identifier, the method further comprising:
   identifying a time-based audio identifier that corresponds to the time-based text identifier; and
   selecting, as the start position, a time-based audio location that corresponds to the identified time-based audio identifier.

4. The method of claim 1 wherein the second electronic content has an image sensory type, the method further comprising:
   displaying a portion of the second electronic content to a user; and
   overlaying, on the displayed portion of the second electronic content, a starting position identifier at the start position.

5. The method of claim 1 further comprising:
   sending a synchronization request over a computer network; and
   receiving the stop position tag in response to the synchronization request.

6. The method of claim 1 wherein the stop position corresponds to a trigger event that is at least in part established by a voice command.

7. The method of claim 1 wherein the electronic device executes both the first electronic content and the second electronic content.

8. The method of claim 1, wherein the touch sensory type at least in part includes the use of brail characters.

9. The method of claim 1 wherein the stop position corresponds to a trigger event that is at least in part established by touch input.

10. An information handling system comprising:
    one or more processors;
    a memory accessible by at least one of the processors;
    a set of instructions stored in the memory and executed by at least one of the processors in order to perform actions of:
    receiving a stop position tag that indicates a stop position within first electronic content, the first electronic content having a first sensory type;
    identifying a start position within second electronic content using the stop position tag, wherein the second electronic content has a second sensory type that is different than the first sensory type; and
    activating a sensory output of an electronic device at the beginning of the paragraph including the start position of the second electronic content;
    wherein at least one of the first and second sensory types is a touch sensory type.

11. The information handling system of claim 10 wherein the set of instructions, when executed by at least one of the processors, further performs actions of:
    extracting a time-based audio identifier from the stop position tag that corresponds with a stop position within the first electronic content;
    identifying a time-based text identifier that corresponds with the extracted time-based audio identifier; and
    selecting, as the start position, a time-based text location within the second electronic content that corresponds with the identified time-based text identifier.

12. The information handling system of claim 10 wherein the stop position corresponds to a time-based text identifier, and wherein the set of instructions, when executed by at least one of the processors, further performs actions of:
    identifying a time-based audio identifier that corresponds to the time-based text identifier; and
    selecting, as the start position, a time-based audio location that corresponds to the identified time-based audio identifier.

13. The information handling system of claim 10 wherein the second electronic content has an image sensory type, and wherein the set of instructions, when executed by at least one of the processors, further performs actions of:
    displaying a portion of the second electronic content to a user; and
    overlaying, on the displayed portion of the second electronic content, a starting position identifier at the start position.

14. The information handling system of claim 10 wherein the set of instructions, when executed by at least one of the processors, further performs actions of:
    sending a synchronization request over a computer network; and
    receiving the stop position tag in response to the synchronization request.

15. A computer program product stored in a non-transitory computer readable storage medium, comprising functional descriptive material that, when executed by an information handling system, causes the information handling system to perform actions that include:
    receiving a stop position tag that indicates a stop position within first electronic content, the first electronic content having a first sensory type;
    identifying a start position within second electronic content using the stop position tag, wherein the second electronic content has a second sensory type that is different than the first sensory type; and activating a sensory output of an electronic device at the start position of the second electronic content;

wherein at least one of the first and second sensory types is a touch sensory type.

16. The computer program product of claim 15 wherein the functional descriptive material, when executed by the information handling system, causes the information handling system to further performs actions of:

extracting a time-based audio identifier from the stop position tag that corresponds with a stop position within the first electronic content;

identifying a time-based text identifier that corresponds with the extracted time-based audio identifier; and selecting, as the start position, a time-based text location within the second electronic content that corresponds with the identified time-based text identifier.

17. The computer program product of claim 15 wherein the stop position corresponds to a time-based text identifier, and wherein the functional descriptive material, when executed by the information handling system, causes the information handling system to further performs actions of:

identifying a time-based audio identifier that corresponds to the time-based text identifier; and selecting, as the start position, a time-based audio location that corresponds to the identified time-based audio identifier.

18. The computer program product of claim 15 wherein the second electronic content has an image sensory type, and wherein the functional descriptive material, when executed by the information handling system, causes the information handling system to further performs actions of:

displaying a portion of the second electronic content to a user; and overlaying, on the displayed portion of the second electronic content, a starting position identifier at the start position.

19. The computer program product of claim 15 wherein the functional descriptive material, when executed by the information handling system, causes the information handling system to further performs actions of:

sending a synchronization request over a computer network; and receiving the stop position tag in response to the synchronization request.

\* \* \* \* \*